United States Patent
Caillot et al.

(10) Patent No.: US 8,499,407 B2
(45) Date of Patent: Aug. 6, 2013

(54) WIPER FOR VEHICLE WINDOWS

(75) Inventors: Gerald Caillot, Cernay la Ville (FR); Jean-Michel Jarasson, Le Mesnil St Denis (FR)

(73) Assignee: Valeo Systèmes d'Essuyage, La Verrière (FR)

( * ) Notice: Subject to any disclaimer, the term of this patent is extended or adjusted under 35 U.S.C. 154(b) by 395 days.

(21) Appl. No.: 12/933,587

(22) PCT Filed: Mar. 23, 2009

(86) PCT No.: PCT/EP2009/053370
§ 371 (c)(1),
(2), (4) Date: Sep. 20, 2010

(87) PCT Pub. No.: WO2009/118286
PCT Pub. Date: Oct. 1, 2009

(65) Prior Publication Data
US 2011/0016653 A1    Jan. 27, 2011

(30) Foreign Application Priority Data
Mar. 26, 2008   (FR) ...................... 08 01632

(51) Int. Cl.
*A47L 1/02* (2006.01)
*B60S 1/04* (2006.01)

(52) U.S. Cl.
USPC ............... 15/250.02; 15/250.06; 15/250.07; 134/45; 296/96.15

(58) Field of Classification Search
USPC ............ 15/250.01, 250.02, 250.04, 250.351, 15/250.361, 250.451, 250.05, 250.06, 250.07, 15/250.08; 134/45; 296/96.15, 96.17
See application file for complete search history.

(56) References Cited

U.S. PATENT DOCUMENTS

| | | | | |
|---|---|---|---|---|
| 1,658,389 A * | 2/1928 | Oishei | .......................... | 15/250.3 |
| 2,561,188 A * | 7/1951 | Ferguson | ..................... | 160/23.1 |
| 3,574,881 A | 4/1971 | Temple | | |
| 5,426,814 A * | 6/1995 | Minnick | ..................... | 15/250.04 |
| 5,539,951 A * | 7/1996 | Guell et al. | ................. | 15/250.04 |
| 6,137,084 A * | 10/2000 | Thomas | ........................ | 219/202 |
| 2003/0028990 A1 * | 2/2003 | Zimmer | ................... | 15/250.201 |
| 2006/0191095 A1 * | 8/2006 | Buchanan, Jr. | .......... | 15/250.352 |
| 2008/0216274 A1 * | 9/2008 | Egner-Walter et al. | .... | 15/250.02 |

FOREIGN PATENT DOCUMENTS

| | | |
|---|---|---|
| DE | 100 39 290 A1 | 2/2002 |
| DE | 100 56 705 A1 | 5/2002 |
| DE | 102 34 267 A1 | 2/2004 |
| EP | 1 418 100 A1 | 5/2004 |
| WO | 2007/000346 A1 | 1/2007 |

OTHER PUBLICATIONS

International Search Report w/translation from PCT/EP2009/053370 dated Jun. 26, 2009 (6 pages).

* cited by examiner

*Primary Examiner* — Joseph Drodge
(74) *Attorney, Agent, or Firm* — Osha Liang LLP

(57) ABSTRACT

The invention relates to a wiper for vehicle windows that comprises structural members comprising at least a longitudinal substrate (10); a stiffening rod (20) arranged as an extension of said substrate (10); a wiping blade (30) attached to said substrate (10); an accessory (40) including at least one tube (42a, 42b) for spraying a washing liquid, said accessory (40) being assembled on said substrate (10). According to the invention, the wiper further includes means (60a, 60b) for heating the washing liquid, said heating means being included in the tubes (42a, 42b) of the accessory (40).

11 Claims, 6 Drawing Sheets

WIPER FOR VEHICLE WINDOWS

The present invention relates to a wiper for vehicle windows.

Today, a technology exists, which relates to wipers for vehicle windows, known as "flexible blade" or "flat blade" and an exemplary embodiment of which is disclosed in the international application number WO2007/000346.

Such "flat blade" technology consists of a structure built around a central member composed of a longitudinal substrate made of a semi-rigid material whereon various other functional members are added.

A first functional member is a metal rod accommodated in a longitudinal cavity of the substrate. This metallic rod has a double function of providing, on the one hand, to the whole wiper the stiffness required for a correct mechanical behaviour, as well as the distribution of pressure exerted by the driving arm on the windscreen. This is the reason why it is often named "spline".

A second functional member is a wiping blade made of elastomer and fixed to the longitudinal substrate through a claw extruded with the substrate.

Finally, a third functional member is an accessory intended to improving the quality of the wiping. Generally speaking, such an accessory is made of elastomer and is assembled with the longitudinal substrate through various means, more particularly through clipping.

A first type of accessory is, for example, a device for spraying an appropriate washing liquid which makes it possible, through an action combined with the wiping motion of the wiper, to eliminate some solid particles which can stick to the windows such as dust or insects crushed against the windscreen. In practice, such a spraying device includes at least a spraying tube having a substantially cylindrical shape and arranged laterally along the longitudinal substrate. In a one-tube version, the spraying tube includes only one tube, whereas in a bi-tube version the device includes two tubes arranged on either side of the longitudinal substrate. In addition, the tubes are provided with holes enabling the spraying of the washing liquid onto the windscreen.

Another type of accessory may be an aerodynamic deflector which uses the relative wind of the vehicle to increase the force of the contact of the wiper against the window to be wiped.

The above-mentioned international application illustrates a wiper developed through the "flat blade" technology, the accessory of which combines into a single member a liquid spraying tube with an aerodynamic deflector.

However, it should be noted that under negative outside temperature conditions, the washing liquid contained in the spraying tube or tubes may freeze because of the absence of anti-freeze product in the liquid. The freezing of the washing liquid in the tubes has harmful consequences, on the one hand, such as blocking the spraying function of the wiper and, on the other hand, contributes to the stiffness of the whole structure of the wiper which is particularly penalizing within the scope of the "flexible blade" technology, which is precisely based on the flexibility of the structure.

In addition, a wiper is known from the German patent application no 102 34 267 which is related with the "flexible blade" technology which includes heating members intended to heat the structure of the wiper. However, this known wiper has no washing liquid spraying tubes.

Thus, one aim of the invention is to provide a wiper for vehicle windows of the flexible blade type which would make it possible to remedy the above-mentioned drawbacks relating to the freezing of the washing liquid contained in one or several spraying tube or tubes when the wiper is provided with such tubes.

Such an object is reached, according to the invention, thanks to a wiper for vehicle windows, including structural members composed at least of:
   a longitudinal substrate,
   a stiffening rod arranged as an extension of said substrate,
   a wiping blade attached to said substrate,
   an accessory including at least one tube for spraying a washing liquid, said accessory being assembled on said substrate,
   characterized in that the wiper further includes means for heating the washing liquid, said heating means being included in at least one of said structural members.

According to a first embodiment of the invention, said heating means includes at least one heating resistive film arranged on at least one of said structural members.

Within the scope of this first embodiment, the invention provides that said heating resistive film is arranged on at least one face of said stiffening rod. The advantage of such a solution is to provide a good propagation of heat towards the spraying tube or tubes because of the metallic nature of the stiffening rod.

Such an advantage may further be enhanced if, according to the invention, said heating resistive film is arranged on one face of said stiffening rod, i.e. on a side edge of said rod, which means in the part of the rod which is the closest to the spraying tubes.

In a first alternative solution of the first embodiment, said heating resistive film is arranged on at least one face of the longitudinal substrate.

According to a second alternative solution of the first embodiment, said heating resistive film is arranged on a face for assembling said accessory onto the longitudinal substrate.

According to a second embodiment of the invention, said heating means includes at least one heating resistive wire integrated in said accessory.

More particularly, the invention provides that said heating resistive wire will be arranged within said spraying tube for a direct heating of the washing liquid by the heating wire.

In a first alternative solution of said second embodiment, the accessory includes an aerodynamic deflector, with said heating resistive wire being integrated within said deflector, close to said spraying tube.

In a second alternative solution of the second embodiment, said heating resistive wire is co-extruded with the accessory, close to said spraying tube. This alternative solution has the advantage of being more easily implemented, since co-extruding the heating resistive wire with the accessory is simpler than threading the wire a posteriori into the spraying tube, for example.

The invention also relates to a wiping system which is characterized in that it includes a wiper according to the invention.

The description which will follow while referring to the appended drawings, given as non-limitative examples, will explain what the invention is and how it can be embodied.

Figure 1A:
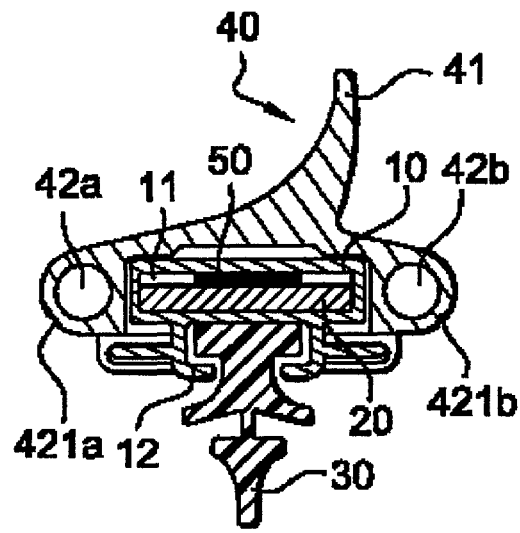
FIG. 1a to 1c are cross-sectional views of the first alternative solutions of a first embodiment of the invention.

On all the figures a wiper for vehicle windows including a longitudinal substrate 10 made of a semi-rigid extruded plastic material is shown in cross-section. Such a substrate 10 includes, as per the "flexible blade" or "flat blade" technology, a recess 11 intended to receive a metallic stiffening rod 20 or "spline" which extends substantially on the whole length of the wiper. The substrate 10 also includes a longitudinal claw 12 wherein a wiper blade 30 made of elastomer is introduced.

An accessory 40 obtained by extrusion independently of the substrate 10 is assembled and fixed on the longitudinal substrate 10. In the figures, the accessory 40 includes a fluid spraying device made of at least a longitudinal tube 42a, 42b perforated with holes 421a, 421b so as to enable a spraying of the washing liquid, for example onto the vehicle window. The accessory 40 is generally composed of only one material, here an extruded elastomer.

In addition, it can be noted in the figures that an aerodynamic deflector 41 is present on the accessory and intended to improve the contact of the wiping blade 30 against the window of the vehicle. It should however be noted that in most cases, such an aerodynamic deflector 41 is not essential to the invention. The embodiment in FIG. 5 only implies the presence of such a deflector.

In order to heat the washing liquid contained in the spraying tube or tubes which might be frozen under negative outside temperature conditions, it is provided in the invention to integrate means for heating the washing liquid to at least one structural member of the wiper. Thus, when bringing the washing liquid in liquid phase to a temperature of at least 0° C., it is possible, on the one hand, to restore the spraying function of the spraying device, such function being otherwise locked by the freezing of the liquid and, on the other hand, to restore the structure of the wiper with the flexibility requested by the very nature of the "flexible blade" technology, since such flexibility might be limited because of the rigidity introduced by the frozen liquid in the spraying tubes.

FIGS. 1a to 3a relate to a first embodiment wherein the heating means is composed of at least one heating resistive film, whereas the FIGS. 4 to 6b illustrate a second embodiment implementing at least one heating resistive wire as heating means.

The alternative solutions of FIGS. 1a to 3a of the first embodiment include only one heating resistive film arranged on the various members of the structure of the wiper.

In FIG. 1a, the heating resistive film 50 is arranged on one face of the stiffening metallic rod 20. This film 50 is made of, for example, a self-adhesive continuous strip which can be cut to the desired length and stuck onto any surface after removing the protective film of the adhesive.

This alternative solution has the advantage of using the correct thermal conductivity of the metal of the rod 20 enabling a quick diffusion of the heat produced by the film 50 towards the spraying tubes 42a, 42b. This quick diffusion of the heat through the stiffening rod 20 also has the advantage of making the temperature of the structure more homogenous, which prevents the degradation of certain members, more particularly those made of plastic material or elastomer, which might get deformed or be submitted to local constraints in areas where the temperature would be too high.

Figure 2A:
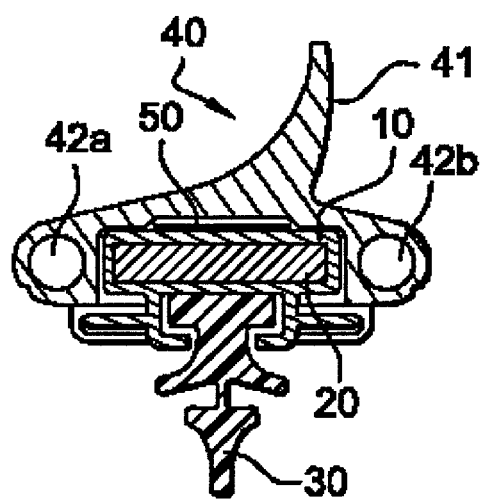
FIGS. 2a and 2b are cross-sectional views of second alternative solutions of the first embodiment of the invention.

In the alternative solution of FIG. 2a, the heating resistive film 50 is arranged on one face of the longitudinal substrate 10.

Figure 3A:
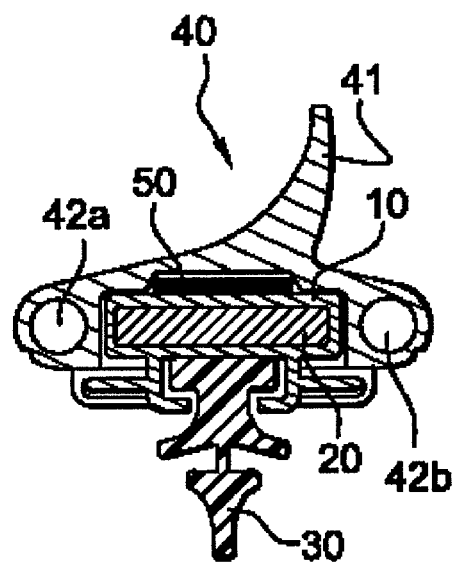
FIGS. 3a and 3b are cross-sectional views of third alternative solutions of the first embodiment of the invention.

In the alternative solution of FIG. 3a, the heating resistive film 50 is arranged on the accessory 40, on the face of which the accessory 40 is assembled to the support 10.

The alternative solutions of FIGS. 1b to 3b include two heating resistive films 50a, 50b making it possible to obtain a more efficient heating and a better distribution of the heat produced in the structure of the wiper.

Figure 1B:
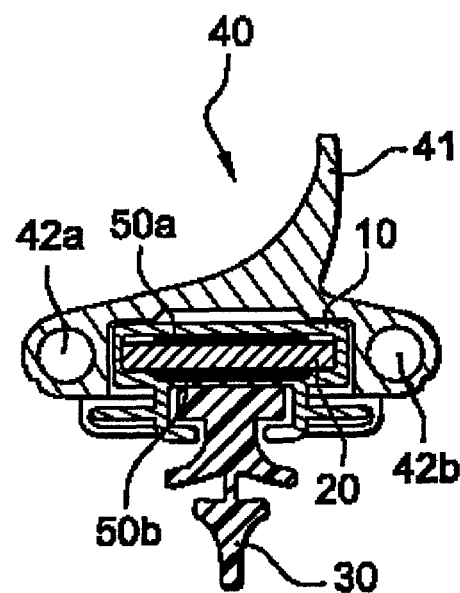

In FIG. 1b, both films 50a, 50b are arranged on both opposite faces of the stiffening rod 20.

Figure 2B:
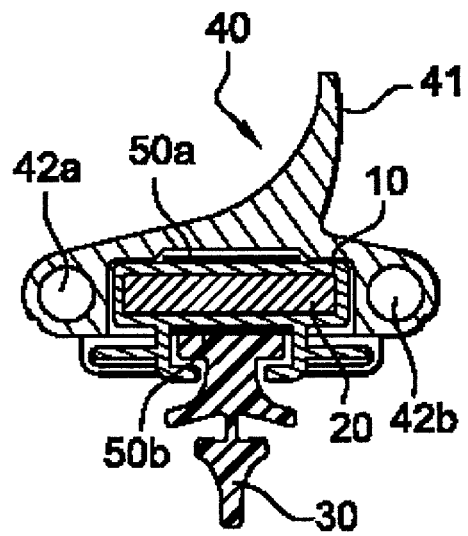

In FIG. 2b, both films 50a, 50b are arranged on both opposite faces of the longitudinal substrate 10.

Figure 3B:
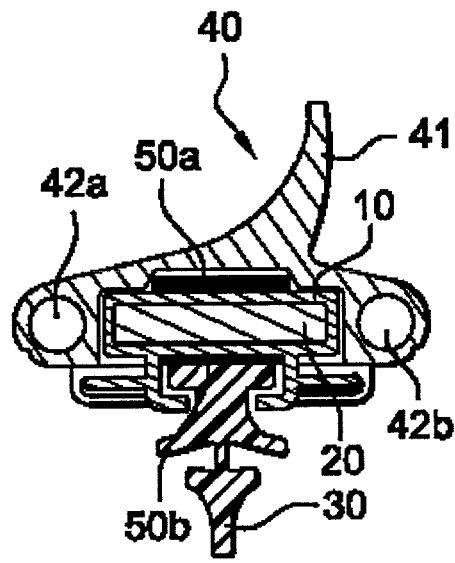

Finally, in FIG. 3b, both films 50a, 50b are respectively arranged on the face for assembling the accessory 40 onto the longitudinal substrate 10 and on the face of said longitudinal substrate 10, opposite the assembling face.

Figure 1C:
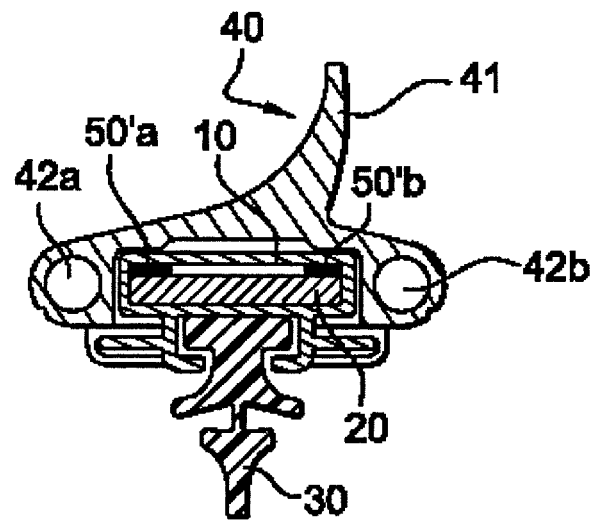

FIG. 1c shows a particularly advantageous alternative solution in that it provides two heating resistive films 50'a, 50'b arranged on the same face of the stiffening metallic rod 20, with each one of such films being arranged on a side edge of the rod, with the aim of being respectively as close to the spraying tube 42a, 42b as possible. It should be understood that such a configuration favours the diffusion of the heat produced by the films towards the tubes 42a, 42b for a more efficient and quicker heating of the washing liquid contained in such tubes. It can also be considered to add two other heating resistive films on the side edge of the other face of the stiffening rod 20 opposite the previous one.

Figure 4:
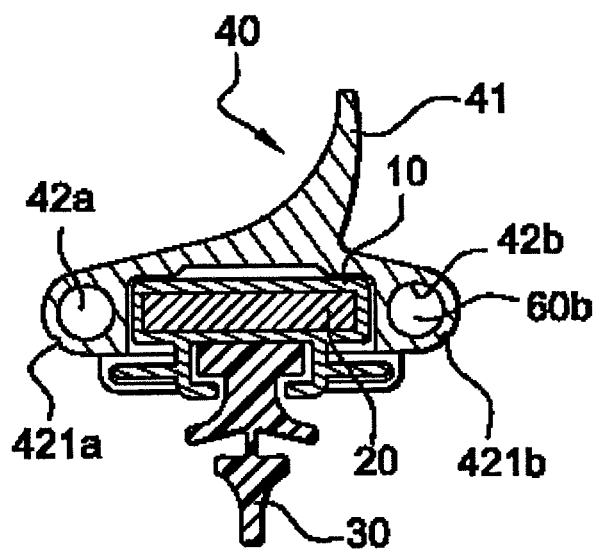
FIG. 4 is a cross-sectional view of a first alternative solution of a second embodiment of the invention.

In the exemplary implementation of the embodiment illustrated in FIG. 4, heating resistive wires 60a, 60b are arranged respectively inside the spraying tubes 42a, 42b. Then, a direct heating of the washing liquid guaranteeing an excellent energy yield is obtained since almost the whole caloric power obtained by Joule effect in the heating wires 60a, 60b is transmitted to the liquid.

However, the alternative solution of FIG. 4 has the drawback that the heating wires may clog the spraying holes 421a, 421b because of their presence inside the tubes 32a, 42b.

Figure 5:
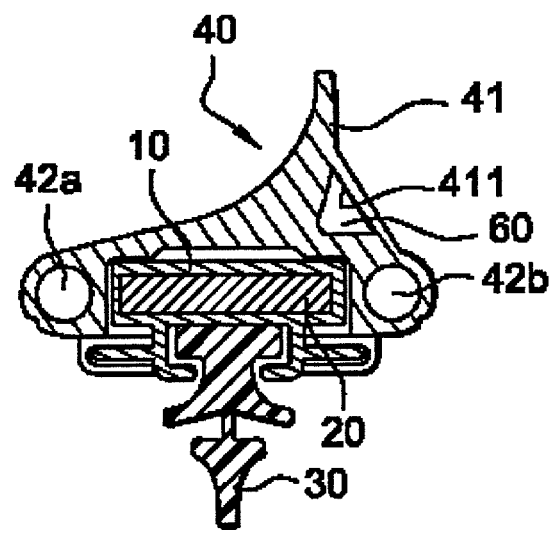
FIG. 5 is a cross-sectional view of a second alternative solution of the second embodiment of the invention.

To remedy such a drawback, the alternative solution of FIG. 5 offers to integrate a heating resistive wire 60 close to the spraying tube 42b, inside a longitudinal cavity 411 provided in the aerodynamic deflector 41. Of course, in this case, only the washing liquid contained in the tube 42b can be substantially unfrozen. This limit has almost no practical consequence since the essential is to restore the spraying function, even at 50%.

Figure 6A:
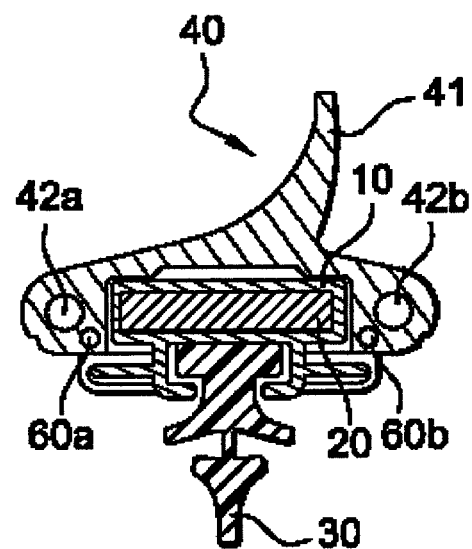
FIGS. 6a and 6b are cross-sectional views of third alternative solutions of the second embodiment of the invention.
Figure 6B:
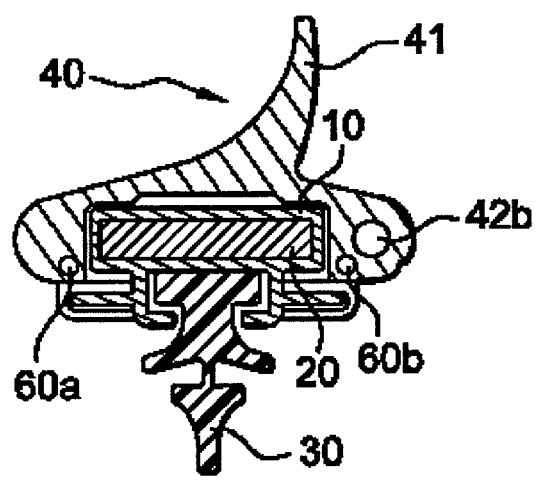

The above-mentioned drawback relating to the presence of wires inside the tubes is also solved by the alternative solutions of FIGS. 6a, 6b which have in common the particularity of having two heating wires 60a, 60b co-extruded with the accessory 40, with one at least of such heating wires being arranged close to a spraying tube.

In FIG. 6a, the heating wires 60a, 60b are respectively arranged close to the tubes 42a, 42b in a bi-tube version of the accessory 40.

In FIG. 6b, only the heating wire 60b is arranged close to a spraying tube 42b in a one-tube version of the accessory 40. In this example, the heating wire 60a is optional and can be used for heating the rest of the structure of the wiper.

This production by co-extrusion is simpler to implement than the one consisting in threading heating wires into tubes, as in FIG. 4, or into a longitudinal cavity, as in FIG. 5. In addition, the accessory 40 thus co-extruded with heating wires may be easily cut to the desired length, as an electric wire is stripped.

The invention claimed is:

1. A wiper for vehicle windows, the wiper comprising structural members comprising:

a longitudinal substrate;

a stiffening rod surrounded by of said substrate;

a wiping blade fixed to said substrate;

an accessory comprising at least one tube for spraying a washing liquid, wherein said accessory is assembled on said substrate; and at least one heating resistive element for heating said washing liquid, wherein said at least one heating resistive element is included in at least one of said structural members.

2. The wiper according to claim 1, wherein said heating resistive element comprises at least one heating resistive film arranged on at least one of said structural members.

3. The wiper according to claim 2, wherein said heating resistive film is arranged on at least one face of said stiffening rod.

4. The wiper according to claim 3, wherein said heating resistive film is arranged on the at least one face of the stiffening rod on a side edge of said rod.

5. The wiper according to claim 2, wherein said heating resistive film is arranged on at least one face of the longitudinal substrate.

6. The wiper according to claim 5, wherein said heating resistive film is arranged on the at least one face for assembling said accessory onto the longitudinal substrate.

7. The wiper according to claim 1, wherein said heating resistive element comprises at least one heating resistive wire integrated in said accessory.

8. The wiper according to claim 7, wherein said heating resistive wire is arranged within said spraying tube.

9. The wiper according to claim 7, wherein said heating resistive wire is co-extruded with the accessory, close to said spraying tube.

10. The wiper according to claim 7, wherein the accessory includes an aerodynamic deflector, and wherein said heating resistive wire is integrated within said deflector close to said spraying tube.

11. A wiping system comprising a wiper according to claim 1.

* * * * *